United States Patent [19]
Terahara

[11] Patent Number: 6,097,535
[45] Date of Patent: Aug. 1, 2000

[54] METHOD FOR OPTICAL AMPLIFICATION AND SYSTEM FOR CARRYING OUT THE METHOD

[75] Inventor: Takafumi Terahara, Kawasaki, Japan

[73] Assignee: Fujitsu Limited, Kawasaki, Japan

[21] Appl. No.: 09/006,049

[22] Filed: Jan. 12, 1998

[30] Foreign Application Priority Data

Aug. 6, 1997 [JP] Japan .................................. 9-211678

[51] Int. Cl.$^7$ ...................................................... H01S 3/00
[52] U.S. Cl. ........................................... 359/341; 359/124
[58] Field of Search ...................................... 359/341, 124

[56] References Cited

U.S. PATENT DOCUMENTS

| | | | |
|---|---|---|---|
| 5,406,404 | 4/1995 | DiGiovanni et al. | 359/161 |
| 5,541,766 | 7/1996 | Mizrahi et al. | 359/337 |
| 5,583,689 | 12/1996 | Cassidy et al. | 359/341 |
| 5,872,650 | 2/1999 | Lee et al. | 359/341 |
| 5,912,750 | 6/1999 | Takeda et al. | 359/124 |

OTHER PUBLICATIONS

N. Bergano, "Wavelength Division Multiplexing in Long-Haul Transmission Systems"; *Journal of Lightwave Technology*, vol. 14, No. 6, Jun. 1996, pp. 1299–1308.

K. Oda, et al., "128 Channel, 480km FSK–DD Transmission Experiment Using 0.98μm Pumped Erbium–doped Fibre Amplifiers and a Tunable Gain Equaliser"; *Electronics Letters*, vol. 30, No. 12, Jun. 1994, pp. 982–983.

T. Naito, et al., "85–Gb/s WDM Transmission Experiment Over 7931km Using Gain Equalization to Compensate for Asymmetry in EDFA Gain Characteristics"; *First Optoelectronics and Communications Conference Technical Digest*, Jul. 1996, pp. 4–5.

*Primary Examiner*—Mark Hellner
*Attorney, Agent, or Firm*—Staas & Halsey, LLP

[57] ABSTRACT

A method and system for optical amplification suitable for wavelength division multiplexing (WDM). Signal light is amplified to obtain amplified signal light. The amplified signal light is gain equalized so that a deviation in signal-to-noise ratio of the amplified signal light with respect to wavelength is reduced to obtain first equalized signal light. The first equalized signal light is amplified to obtain amplified equalized signal light. The amplified equalized signal light is gain equalized so that a deviation in signal power of the amplified equalized signal light with respect to wavelength is reduced. This method is characterized in that in performing optical amplification of signal light plural times gain equalization is performed in the middle stage of the optical amplification so that the deviation in signal-to-noise ratio is reduced, and gain equalization is performed after the final stage of the optical amplification so that the deviation in signal power is reduced. According to this method, gain equalization can be easily performed on both the deviation in signal power and the deviation in signal-to-noise ratio.

23 Claims, 12 Drawing Sheets

F I G. 1 3 A
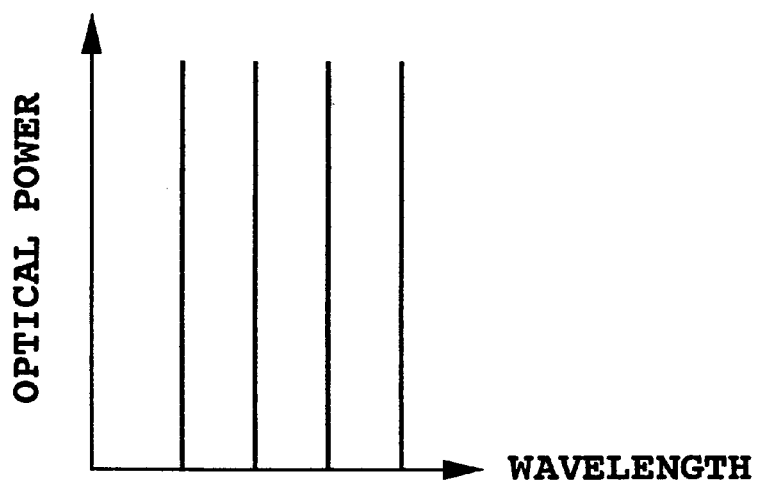
F I G. 1 3 B
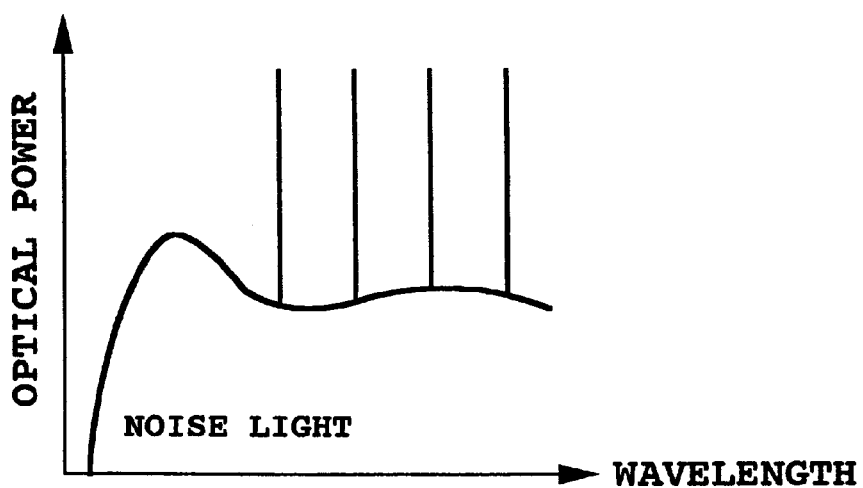

METHOD FOR OPTICAL AMPLIFICATION AND SYSTEM FOR CARRYING OUT THE METHOD

BACKGROUND OF THE INVENTION

1. Field of the Invention

The present invention relates generally to optical amplification suitable for optical fiber communication using wavelength division multiplexed signal light including a plurality of channels of optical carriers having different wavelengths, and more particularly to a method for such optical amplification and a system for carrying out the method.

2. Description of the Related Art

In recent years, a manufacturing technique and using technique for a low-loss (e.g., 0.2 dB/km) optical fiber have been established, and an optical communication system using the optical fiber as a transmission line has been put to practical use. Further, to compensate for losses in the optical fiber and thereby allow long-haul transmission, the use of an optical amplifier for amplifying signal light has been proposed or put to practical use.

An optical amplifier known in the art includes an optical amplifying medium to which signal light to be amplified is supplied and means for pumping the optical amplifying medium so that the optical amplifying medium provides a gain band including the wavelength of the signal light. For example, an erbium doped fiber amplifier (EDFA) includes an erbium doped fiber (EDF) as the optical amplifying medium and a pump light source for supplying pump light having a predetermined wavelength to the EDF. By preliminarily setting the wavelength of the pump light within a 0.98 μm band or a 1.48 μm band, a gain band including a wavelength of 1.55 μm can be obtained. Further, another type optical amplifier having a semiconductor chip as the optical amplifying medium is also known. In this case, the pumping is performed by injecting an electric current into the semiconductor chip.

As a technique for increasing a transmission capacity by a single optical fiber, wavelength division multiplexing (WDM) is known. In a system adopting WDM, a plurality of optical carriers having different wavelengths are used. The plural optical carriers are individually modulated to thereby obtain a plurality of optical signals, which are wavelength division multiplexed by an optical multiplexer to obtain WDM signal light, which is output to an optical fiber transmission line. On the receiving side, the WDM signal light received is separated into individual optical signals by an optical demultiplexer, and transmitted data is reproduced according to each optical signal. Accordingly, by applying WDM, the transmission capacity in a single optical fiber can be increased according to the number of WDM channels.

In the case of incorporating an optical amplifier into a system adopting WDM, a transmission distance is limited by the wavelength dependence of gain which is represented by a gain tilt or gain deviation. For example, in an EDFA, it is known that a gain tilt is produced at wavelengths in the vicinity of 1.55 μm, and this gain tilt varies with total input power of signal light and pump light power to the EDFA.

A gain equalization method is known as measures against the wavelength dependence of gain of an optical amplifier. This method will be described with reference to FIGS. 1 to 3.

FIG. 1 is a block diagram showing a conventional optical communication system adopting WDM. A plurality of optical signals having different wavelengths are output frm a plurality of optical senders (OS) 2 (#1 to #N), respectively, and next wavelength division mulitplexed in an optical multiplexer 4 to obtain WDM signal light. The WDM signal light is next output to an optical transmission line 6. The optical transmission line 6 is configured by providing a plurality of optical amplifiers 8 for compensating for losses and at least one gain equalizer 10 in an optical fiber transmission line 7. Each gain equalizer 10 may be provided by an optical filter. The WDM signal light transmitted by the optical transmission line 6 is separated into individual optical signals according to wavelengths by an optical demultiplexer 12, and these optical signals are next supplied to a plurality of optical receivers (OR) 14 (#1 to #N), respectively.

Referring to FIG. 2, there is shown an example of the spectrum of the WDM signal light output from the optical multiplexer 4 to the optical transmission line 6 in the system shown in FIG. 1. In FIG. 2, the vertical axis represents optical power, and the horizontal axis represents wavelength. In this example, the optical senders 2 (#1 to #N) output optical signals having wavelengths ($\lambda_1$ to $\lambda_N$), respectively. When preemphasis is not considered, the optical powers of the optical signals in all the channels are equal to each other in general. In this example, the band of the WDM signal light is defined by the wavelength range of $\lambda_1$ to $\lambda_N$ as shown by reference numeral 16.

If each optical amplifier 8 in the system shown in FIG. 1 has a wavelength dependence of gain in the band 16 of the WDM signal light, the wavelength dependence of gain is accumulated over the length of the optical transmission line 6, causing an interchannel deviation in signal power or signal-to-noise ratio (optical SNR). In the gain equalization method, the characteristics of each gain equalizer 10 are set so as to cancel the accumulated wavelength dependence of gain of the optical amplifiers 8. This will now be described more specifically with reference to FIG. 3.

In FIG. 3, the broken line shown by reference numeral 18 represents the accumulated wavelength dependence of gain of the optical amplifiers 8, and the solid line shown by reference numeral 20 represents the wavelength dependence of loss in the gain equalizer 10. In the example shown, the wavelength dependence of gain is canceled by the wavelength dependence of loss in the band 16 of the WDM signal light, thereby achieving gain equalization in the whole of the optical transmission line 6.

In the case that an EDFA is used as each optical amplifier 8, the wavelength dependence of gain of the EDFA is asymmetrical with respect to a wavelength axis in general. In contrast, the wavelength dependence of loss of one optical filter usable as an element of each gain equalizer 10 is symmetrical with respect to a wavelength axis in general. Accordingly, in the case that each gain equalizer 10 includes only one optical filter, the asymmetrical accumulated wavelength dependence of gain of the optical amplifiers 8 cannot be compensated. As the optical filter, a dielectric multilayer film filter, etalon filter, Mach-Zehnder filter, etc. are known. These filters can be precisely manufactured, and the reliability has been ensured.

As the related prior art to compensate for the asymmetrical wavelength dependence of an optical amplifier, it has been proposed to configure a gain equalizer by combining two or more optical filters having different wavelength dependences of loss. With this configuration, the wavelength dependence of gain can be canceled by the wavelength dependence of loss with high accuracy in a given band of WDM signal light.

Additional details of the gain equalization method is described in Reference (1) shown below, and additional details of the combination of plural optical filters is described in References (2), (3), and (4) shown below.

(1) N. S. Bergano et al., "Wavelength division multiplexing in long-haul transmission systems", JOURNAL OF LIGHTWAVE TECHNOLOGY, VOL. 14, NO. 6, JUNE 1996, pp1229–1308.

(2) K. Oda et al., "128-channel, 480-km FSK-DD transmission experiment using 0.98 μm pumped erbium doped fibre amplifiers and a tunable gain equaliser", ELECTRONICS LETTERS, Jun. 9th 1994, Vol. 30, No. 12, pp982–983.

(3) T. Naito et al., "85-Gb/s WDM transmission experiment over 7931 km using gain equalization to compensate for asymmetry in EDFA gain characteristics", First Opto-electronics and Communications Conference (OECC '96) Technical Digest, July 1996, PD1–2.

(4) T. Oguma et al., "Optical gain equalizer for optical fiber amplifier", Communications Society Conference, IEICE, 1996, B-1093 (pp578).

Referring to FIGS. 4A and 4B, there are shown examples of an optical spectrum after transmission in a system adopting the gain equalization method. In each example, a plurality of steep signal spectra are superimposed on a relatively gentle noise spectrum. In the example shown in FIG. 4A, a deviation in signal power is suppressed by gain equalization. That is, gain equalization is performed so that the peaks of optical powers of the signal spectra are equal to each other. In this case, a signal-to-noise ratio (optical SNR) given as the length of each signal spectrum on the basis of the noise spectrum differs according to channel, that is, there remains an interchannel deviation in optical SNR. In a land communication system, for example, gain equalization is performed in such a manner that the interchannel deviation in optical SNR is permitted and the interchannel deviation in signal power is eliminated. Conversely, gain equalization may be performed in such a manner that the interchannel deviation in signal power is permitted and the interchannel deviation in optical SNR is suppressed as shown in FIG. 4B.

In either case of the conventional gain equalization method, attention is paid to only one of the signal power and the optical SNR, and gain equalization is performed on either subject. As a result, the conventional gain equalization method has a problem caused by a deviation remaining in the other of the signal power and the optical SNR. For example, in the case of performing gain equalization on the optical SNR deviation as shown in FIG. 4B, a deviation remains in the signal power, causing a problem in system construction such that a signal level diagram at a receiving terminal station differs. In the case of performing gain equalization on the signal power deviation as shown in FIG. 4A, a deviation remains in the optical SNR, causing a problem such that a transmission quality varies according to channel.

SUMMARY OF THE INVENTION

It is therefore an object of the present invention to provide a method for optical amplification which can easily perform gain equalization on both the deviation in signal power and the deviation in optical SNR.

It is another object of the present invention to provide a system used in carrying out the method.

In accordance with a first aspect of the present invention, there is provided a method comprising the steps of (a) amplifying signal light to obtain amplified signal light; (b) gain equalizing the amplified signal light so that a deviation in signal-to-noise ratio of the amplified signal light with respect to wavelength is reduced to obtain first equalized signal light; (c) amplifying the first equalized signal light to obtain amplified equalized signal light; and (d) gain equalizing the amplified equalized signal light so that a deviation in signal power of the amplified equalized signal light with respect to wavelength is reduced to obtain second equalized signal light.

This method is characterized in that in performing optical amplification of signal light plural times gain equalization is performed in the middle stage of the optical amplification so that the deviation in signal-to-noise ratio with respect to wavelength is reduced, and gain equalization is performed after the final stage of the optical amplification so that the deviation in signal power with respect to wavelength is reduced. That is, gain equalization is performed at least two times. According to this method, gain equalization can be easily performed on both the deviation in signal power and the deviation in signal-to-noise ratio in accordance with the principle to be hereinafter described.

In accordance with a second aspect of the present invention, there is provided a system for carrying out the method according to the present invention. This system includes a plurality of optical amplifiers cascaded for amplifying signal light. A first optical filter is provided between any two adjacent ones of the plural optical amplifiers. The first optical filter performs gain equalization of the signal light so that a deviation in signal-to-noise ratio of the signal light with respect to wavelength is reduced. A second optical filter is provided downstream of the plural optical amplifiers. The second optical filter performs gain equalization of the signal light so that a deviation in signal power of the signal light with respect to wavelength is reduced.

In accordance with a third aspect of the present invention, there is provided a system comprising an optical fiber span comprising a plurality of sections; a first terminal station connected to one end of the optical fiber span for supplying signal light to the optical fiber span; and a second terminal station connected to the other end of the optical fiber span for receiving the signal light from the optical fiber span. Each of the plural sections comprises the elements of the system according to the second aspect of the present invention.

In accordance with a fourth aspect of the present invention, there is provided a system comprising a plurality of optical fiber spans connected by an optical add-drop multiplexer. Each of the plural optical fiber spans comprises at least one section, which comprises the elements of the system according to the second aspect of the present invention.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIGS. 13A and 13B are graphs showing two examples of an input light spectrum.

DETAILED DESCRIPTION OF THE PREFERRED EMBODIMENTS

Some preferred embodiments of the present invention will now be described in detail.

Figure 5:
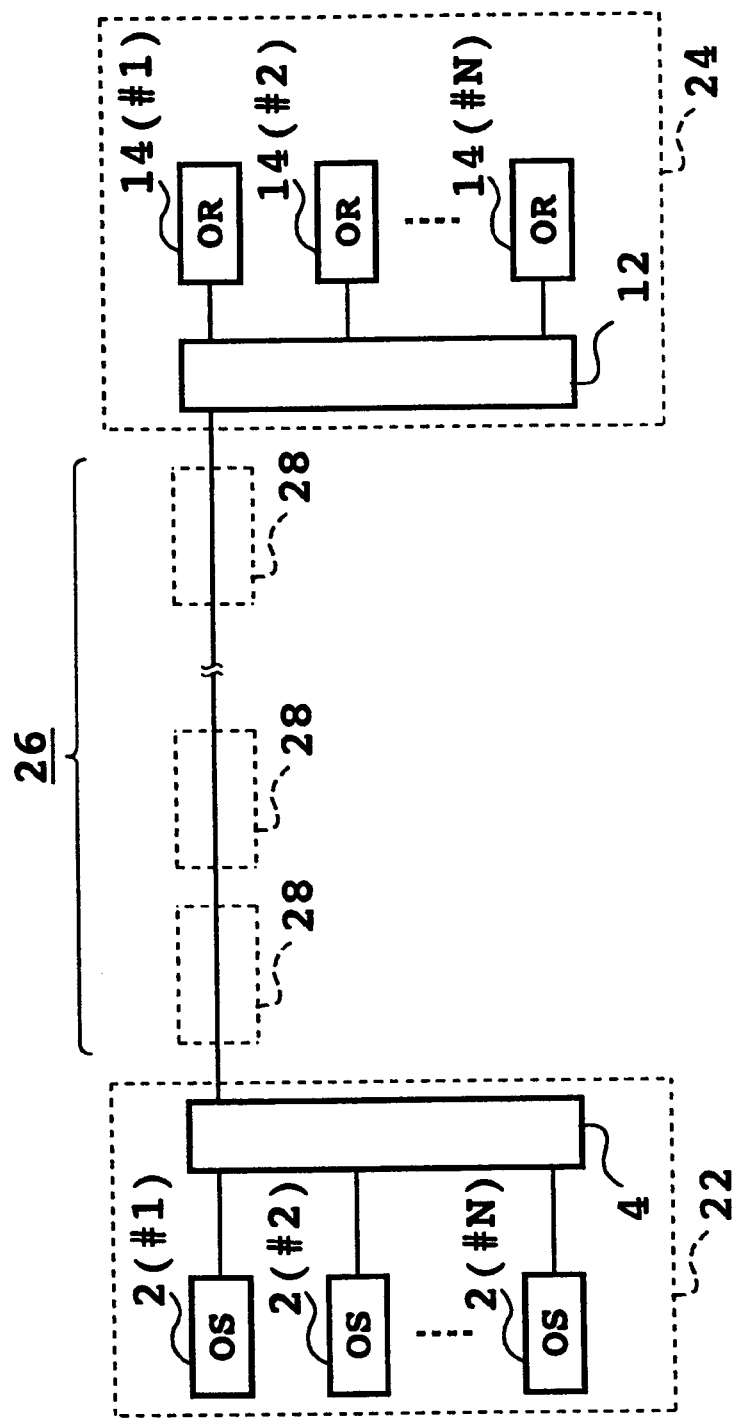
FIG. 5 is a block diagram showing a first preferred embodiment of the optical communication system according to the present invention.

FIG. 5 is a block diagram showing a first preferred embodiment of the optical communication system according to the present invention. This system includes a first terminal station 22 for sending, a second terminal station 24 for receiving, and an optical fiber span 26 laid between the terminal stations 22 and 24. The optical fiber span 26 is composed of a plurality of sections 28 cascaded. The first terminal station 22 includes a plurality of optical senders 2 (#1 to #N) for outputting optical signals having different wavelengths and an optical multiplexer 4 for wavelength division multiplexing these optical signals to obtain WDM signal light. The WDM signal light is supplied to the optical fiber span 26. The second terminal station 24 includes an optical demultiplexer 12 for separating the WDM signal light from the optical fiber span 26 according to wavelengths to obtain optical signals in individual channels and a plurality of optical receivers 14 (#1 to #N) for receiving these optical signals.

Figure 6:
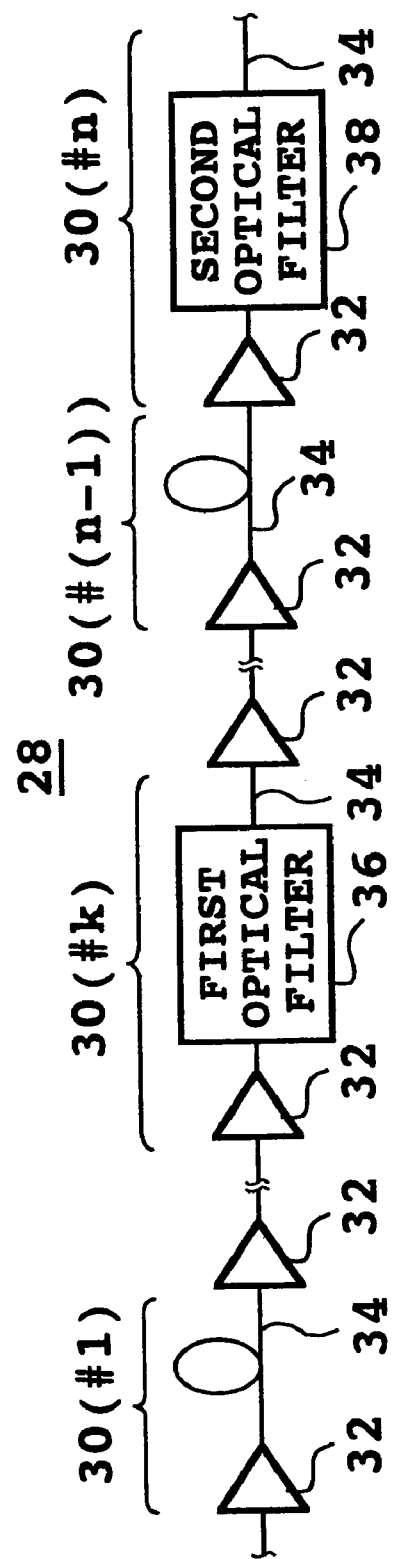
FIG. 6 is a block diagram showing a first preferred embodiment of each section 28.

FIG. 6 is a block diagram showing a first preferred embodiment of each section 28. Each section 28 is composed of a plurality of subsections 30 (#1 to #n) cascaded. Each of the subsections 30 (#1 to #n) includes an optical amplifier 32 and an optical fiber transmission line 34 provided downstream of the optical amplifier 32. In this preferred embodiment, a first optical filter 36 is provided on the optical fiber transmission line 34 in the subsection 30 (#k). When the number of the subsections is n, k satisfies $1 \leq k < n$. That is, the first optical filter 36 is provided in any one subsection except the most downstream subsection 30 (#n). A second optical filter 38 is provided on the optical fiber transmission line 34 in the most downstream subsection 30 (#n).

The first optical filter 36 functions to gain equalize the WDM signal light so that a deviation in optical SNR between channels in the WDM signal light becomes small. The second optical filter 38 functions to gain equalize the WDM signal light so that a deviation in signal power between channels in the WDM signal light becomes small.

While the first optical filter 36 is provided in one of the subsections 30 (#1 to #(n−1)) as shown, the first optical filter 36 may be provided in each of plural ones of the subsections 30 (#1 to #(n−1)).

Figure 7:
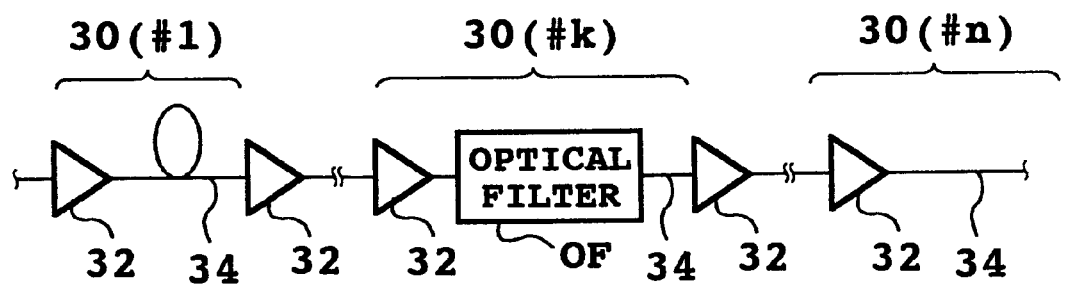
FIG. 7 is a block diagram showing a comparison for illustrating the technical effect of the first preferred embodiment shown in FIG. 6.

FIG. 7 is a block diagram showing a comparison for illustrating the technical effect of the first preferred embodiment shown in FIG. 6. The reasons why the conventional method cannot simultaneously gain equalize the deviation in optical SNR and the deviation in signal power and the present invention can solve the problem of the conventional method will now be described with reference to FIGS. 6 and 7.

It is now assumed that a single optical fiber OF as a gain equalizer is inserted in the optical fiber 34 in the subsection 30 (#k) as shown in FIG. 7. An optical amplifier gain G,i and a gain equalizer loss Γ,i for an i channel ($1 \leq i \leq N$) are expressed as follows:

$$G,i = \alpha,i\,Go,\quad \Gamma,i = \beta,i\Gamma o \tag{1}$$

where Go and Γo are the average gain of the optical amplifiers 32 and the average loss of the subsections, respectively. Usually, GoΓo=1 because the system is designed so as to balance the loss and the gain. Further, α,i and β,i are the gain deviation of the optical amplifier 32 and the loss deviation of the optical filter OF in the i channel, respectively.

Assuming that the number of the subsections is n, that the optical filter OF is located in the k-th subsection 30 (#k) as shown, and that signal light having power Pin,i is input, the signal light power Pout,i and the noise light power Pase,i in the output are expressed as follows:

$$Pout,i = (\alpha,i^n \beta,i) Pin,i \tag{2}$$

$$Pase,i = \beta,i\alpha,i^{n-k}(2h\nu B)Nsp,i\Sigma\alpha,i + (2h\nu B)Nsp,i\Sigma\alpha,i \tag{3}$$

where the noise light power Pn generated by one of the optical amplifiers 32 is given by the following equation.

$$Pn = 2h\nu B\,Nsp,i\,G,i \tag{4}$$

In Eq. (4), hν is the photon energy, B is the measuring bandwidth, and Nsp, i is the population inversion parameter in the i channel. Accordingly, the optical SNR OSNRi in the output is given by the following equation.

$$OSNRi = Pout,i/Pase,i = Pin,i(\alpha,i^n\beta,i)/[\beta,i\alpha,i^{n-k}(2h\nu B)Nsp,i\Sigma\alpha,i + (2h\nu B)Nsp,i\Sigma\alpha,i] \tag{5}$$

It is now considered that the input signal light powers in all the channels are equal (i.e., Pin,i is a constant). The condition for eliminating the interchannel deviation in signal power is obtained from Eq. (2). The gain deviation α,i is a value determined by the optical amplifier used. Accordingly, it is understood that the condition for maintaining Pout,i constant for the i channel is to adjust the value of the optical filter loss deviation β,i according to the gain deviation α,i. On the other hand, the condition for eliminating the interchannel deviation in optical SNR is represented by Eq. (5). In Eq. (5), hν and B are constants. Further, the population inversion parameter Nsp,i varies according to wavelength and is a value determined by the optical amplifier used as similar to the gain deviation α,i. It is understood that the condition for maintaining OSNRi constant for the i channel is to adjust the value of the loss deviation β,i according to the gain deviation α,i and the population inversion parameter Nsp,i. There exists no value of the loss deviation β,i simultaneously satisfying the conditions by both Eq. (2) and Eq. (5). Therefore, the deviation in optical SNR and the deviation in signal power cannot be simultaneously eliminated in the case of using the single optical filter OF.

To the contrary, according to the first preferred embodiment shown in FIG. 6, the deviation in optical SNR is first eliminated by the first optical filter 36 and the deviation in signal power is next eliminated by the second optical filter 38. Since the optical filters 36 and 38 are passive components, they merely impart a loss to light. The amount of loss to noise light and the amount of loss to signal light are equal at the same wavelength, so that there is no change in optical SNR between on the upstream side and on the downstream side of each optical filter. Accordingly, by once eliminating the deviation in optical SNR by the first optical filter 36, the output from the second optical filter 38 can be maintained in the condition that the deviation in optical SNR has already been eliminated by the first optical filter 36 and the deviation in signal power is also eliminated by the second optical filter 38.

It is now assumed that the roles of the first optical filter 36 and the second optical filter 38 are reversed, that is, the deviation in signal power is suppressed by the first optical filter 36. In this case, the deviation in optical SNR remains at the input of the second optical filter 38. As mentioned above, there is no change in optical SNR between on the upstream side and on the downstream side of each optical filter. Therefore, in the case that the filters 36 and 38 are reversed, simultaneous gain equalization of the deviation in optical SNR and the deviation in signal power is impossible.

Further, it is now assumed that the second optical filter 38 is located in any subsection except the most downstream subsection 30 (#n). In this case, it is necessary to find out a solution such that the wavelength dependences of losses of the filters 36 and 38 are simultaneously changed and both the deviation in optical SNR and the deviation in signal power are eliminated, causing a difficulty of designing of each optical filter. For such a reason, the provision of the second optical filter 38 for suppressing the signal power deviation in the most downstream subsection 30 (#n) is greatly effective for facilitation of designing of the optical filters 36 and 38.

Thus, by configuring each section 28 as shown in FIG. 6, both the signal power deviation and the optical SNR deviation can be suppressed, and the designing of the optical filters 36 and 38 can be facilitated.

The above description is based on the premise that no preemphasis is performed in the terminal station 22 (see FIG. 5), that is, the signal powers in all the channels are equal.

In general, the number of subsections enabling suppression of the optical SNR deviation by a single optical filter only is several to tens of subsections. Accordingly, in the preferred embodiment shown in FIG. 6 using the single optical filter 36, several to tens of subsections are preferably provided.

In the system shown in FIG. 5, the optical SNR deviation and the signal power deviation are suppressed in each section 28. Accordingly, in the case that the first terminal station 22 outputs WDM signal light with no preemphasis, the second terminal station 24 can receive the WDM signal light in the condition that the optical SNR deviation and the signal power deviation are small, thus achieving the object of the present invention.

Furthermore, the above-mentioned setting on gain equalization in each section 28 facilitates management of the system. That is, in a large-scale system using a large number of (e.g., 200) optical amplifiers 32, each section 28 can be managed as one unit, thereby facilitating designing and construction of the system.

Figure 8:
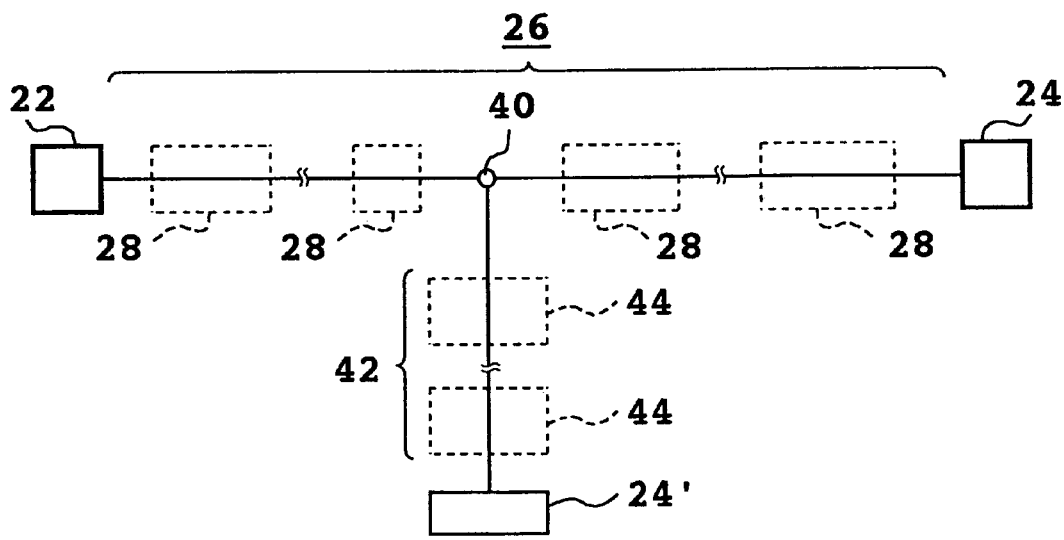
FIG. 8 is a block diagram showing a second preferred embodiment of the optical communication system according to the present invention.

FIG. 8 is a block diagram showing a second preferred embodiment of the optical communication system according to the present invention. In contrast with the preferred embodiment shown in FIG. 5, this system is characterized in that an optical branching device 40 is provided between adjacent two sections 28. The optical branching device 40 functions to extract the WDM optical signal in the optical fiber span 26 as branch signal light. The branch signal light is transmitted to a third terminal station 24' by a branch span 42. The third terminal station 24' is similar in configuration to the second terminal station 24. The branch span 42 is composed of a plurality of branch sections 44 cascaded. The branch sections 44 may be replaced by a single branch section. Each branch section 44 is similar in configuration to each section 28 of the optical fiber span 26.

In the system shown in FIG. 8, the optical SNR deviation and the signal power deviation are suppressed in each section 28 and each branch section 44. Accordingly, it is unnecessary to consider changes in optical SNR and signal power due to the branching. Thus, the system can be easily designed and constructed.

Figure 1:
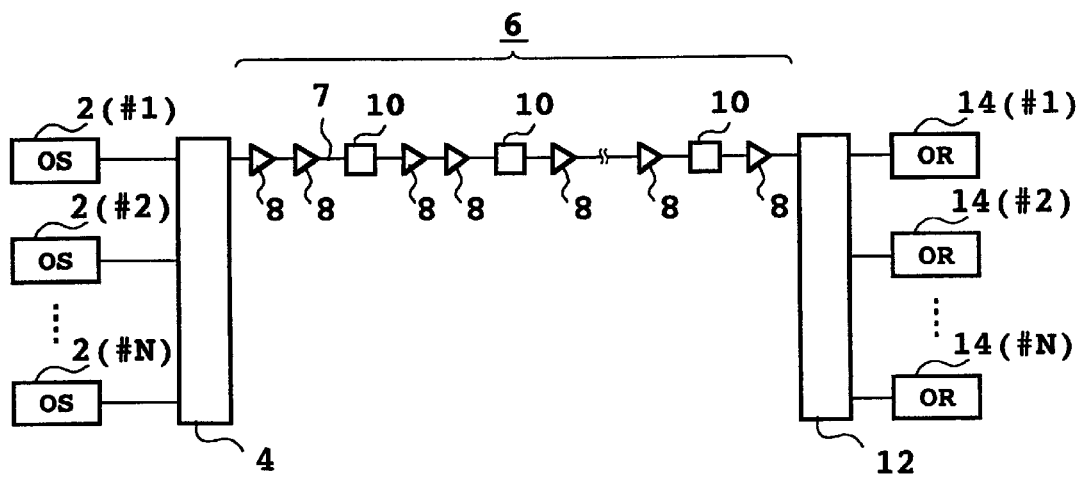
FIG. 1 is a block diagram showing a conventional optical communication system adopting WDM.
Figure 2:
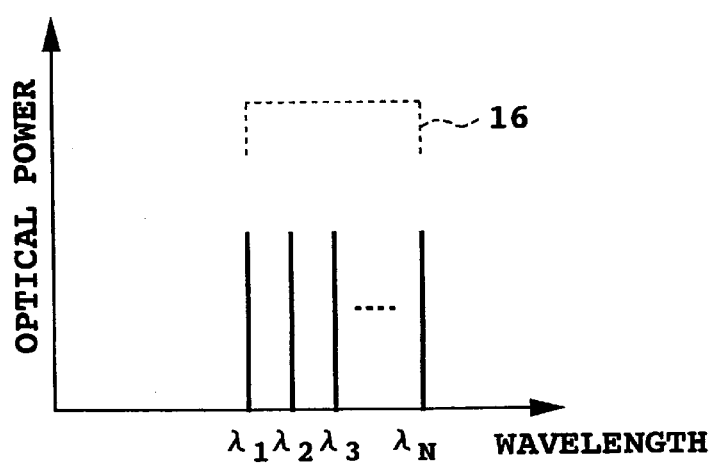
FIG. 2 is a graph showing an example of the spectrum of WDM signal light in the system shown in FIG. 1.
Figure 3:
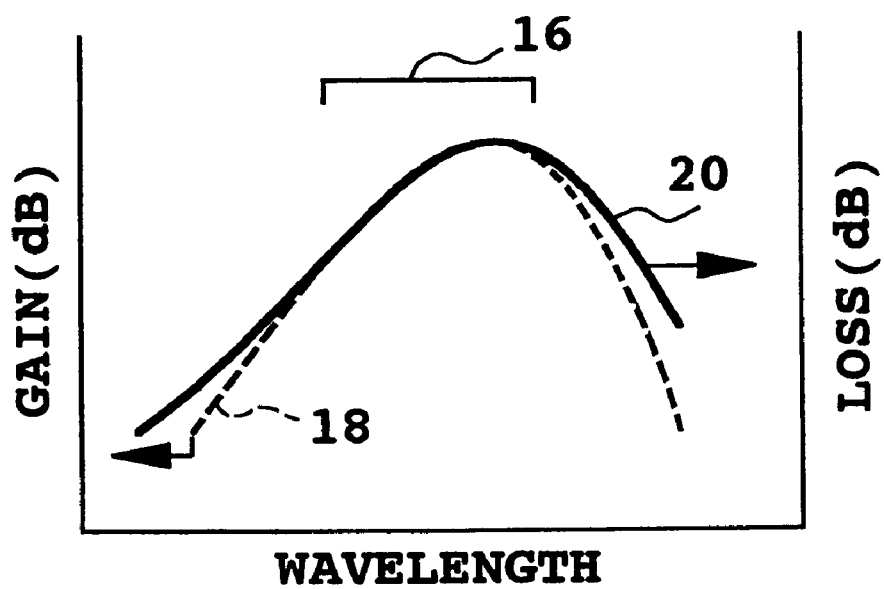
FIG. 3 is a graph for illustrating a gain equalization method in the prior art.
Figure 4A:
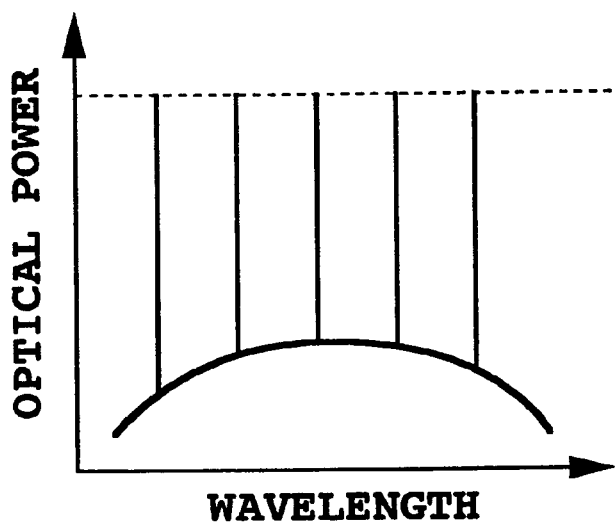
FIGS. 4A and 4B are graphs showing manners of suppression of a deviation in signal power and a deviation in optical SNR by gain equalization, respectively.
Figure 4B:
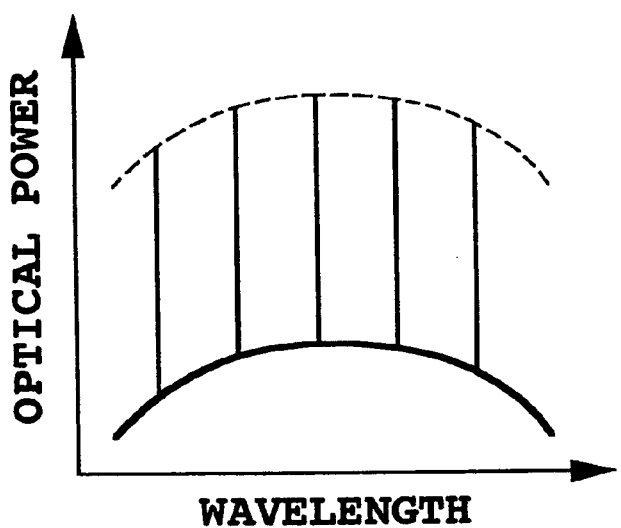

In the case of adding an optical branching device into the conventional system shown in FIG. 1 at a position where any of the gain equalizers 10 is located, it is necessary to reconsider the insertion positions of all the gain equalizers 10 and the wavelength dependences of losses thereof. To the contrary, according to the preferred embodiment shown in FIG. 8, the application of the gain equalization method to each section 28 and each branch section 44 can be easily managed, so that it is sufficient to reconsider the above items in the adjacent sections on the upstream and downstream sides of the optical branching device 40.

In the case that bidirectional transmission is applied to the system shown in FIG. 8, an optical add-drop multiplexer (optical add-drop circuit) may be provided in place of the optical branching device 40.

Figure 9:
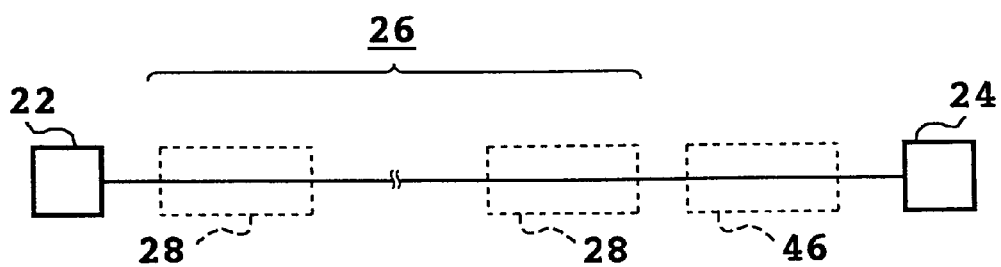
FIG. 9 is a block diagram showing a third preferred embodiment of the optical communication system according to the present invention.

FIG. 9 is a block diagram showing a third preferred embodiment of the optical communication system according to the present invention. In contrast with the preferred embodiment shown in FIG. 5, this system is characterized in that an additional section 46 is provided between the most downstream section 28 and the second terminal station 24. The additional section 46 has a configuration obtained by omitting the second optical filter 38 in the section 28 shown in FIG. 6. On the basis of the premise that gain equalization is properly performed in each section 28, the signal power deviation in the additional section 46 becomes tolerably small. Accordingly, the second optical filter 38 for suppressing the signal power deviation can be omitted in the additional section 46 located nearest to the second terminal station 24.

In the case that the signal power deviation in the additional section 46 is intolerable, an optical filter corresponding to the second optical filter 38 may be located in the second terminal station 24.

Figure 10:
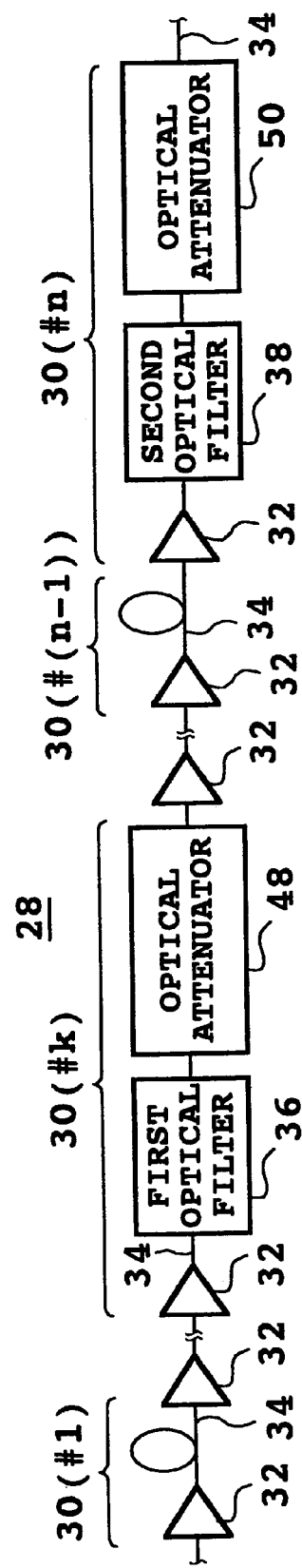
FIG. 10 is a block diagram showing a second preferred embodiment of each section 28.

FIG. 10 is a block diagram showing a second preferred embodiment of each section 28. In contrast with the first preferred embodiment shown in FIG. 6, an optical attenuator 48 is provided downstream of the first optical filter 36 and an optical attenuator 50 is provided downstream of the second optical filter 38, thereby making the input levels of the optical amplifiers 32 almost equal to each other. More specifically, the optical attenuator 50 is provided to make the output signal light power level of the instant-stage section 28 coincide with the input signal light power level of the next-stage section 28. Further, the optical attenuator 48 is provided to perform level adjustment for the subsection 30 (#k) in which the first optical filter 36 is inserted. By suitably adjusting the optical attenuators 48 and/or 50, each section 28 even in a multistage connected configuration can be operated like in the unconnected condition.

Figure 11:
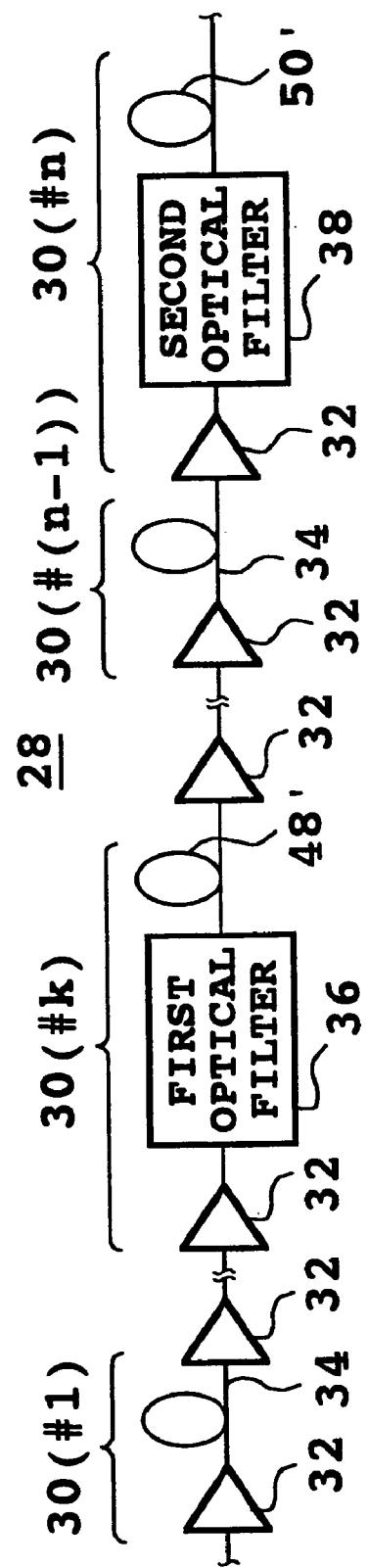
FIG. 11 is a block diagram showing a third preferred embodiment of each section 28.

FIG. 11 is a block diagram showing a third preferred embodiment of each section 28. In this preferred embodiment, optical fibers 48' and 50' functioning as optical attenuators are provided in place of the optical attenuators 48 and 50 shown in FIG. 10. In this case, attenuation can be adjusted according to the lengths of the optical fibers 48' and 50'. As compared with the preferred embodiment shown in FIG. 10 wherein the optical attenuators 48 and 50 are provided at fixed points, each section 28 can be elongated by the lengths of the optical fibers 48' and 50'.

In the first preferred embodiment of each section 28 shown in FIG. 6, the first optical filter 36 may be provided in any one of the subsections 30 (#1 to #(n−1)) or in each of plural ones of the subsections 30 (#1 to #(n−1)) as mentioned above. Preferably, the first optical filter 36 is singly provided at a substantially central position in the section 28. More specifically, the first optical filter 36 is singly provided preferably at a position dividing all the optical amplifiers 32 in the section 28 into substantially equal two groups.

The first reason for singly providing the first optical filter 36 is that optical coupling of an optical filter and an optical fiber causes coupling loss, so that dispersive arrangement of plural optical filters in an optical fiber causes an increase in total loss by all the gain equalizers. The second reason for singly providing the first optical filter 36 is that the smaller the number of optical filters, the easier the construction of the system.

The reason for locating the first optical filter 36 at a substantially central position in the section 28 will now be described in detail.

Figure 12A:
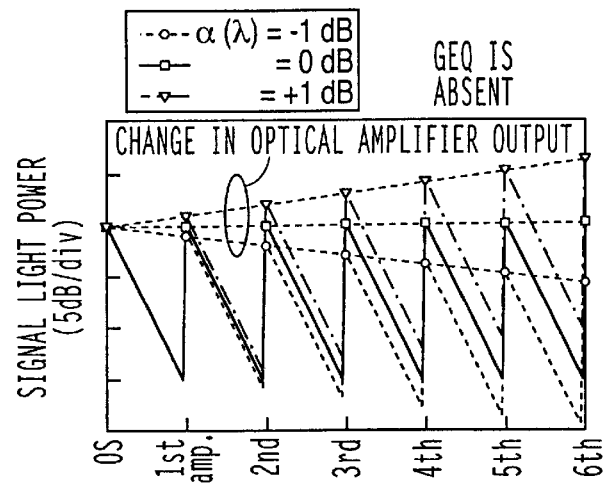
FIGS. 12A to 12C are graphs showing the level diagrams of signal power in different conditions.

If the first optical filter 36 is absent in the configuration shown in FIG. 6, the level diagram of signal power from the optical amplifier 32 in the subsection 30 (#1) to the optical amplifier 32 in the subsection 30 (#n) becomes as shown in FIG. 12A. In this case, it is assumed that n=6 and the gain deviation $\alpha(\lambda)$ of each optical amplifier 32 is within ±1 dB.

An optical signal having a wavelength giving a gain smaller than the average gain Go (i.e., a wavelength giving $\alpha(\lambda)<0$) attenuates more largely than an optical signal having a wavelength giving a gain equal to the average gain Go (i.e., a wavelength giving $\alpha(\lambda)=0$). Since the attenuation of signal power is large for the accumulation of ASE (amplified spontaneous emission; noise light), the optical SNR becomes smaller than that of the optical signal having the wavelength giving $\alpha(\lambda)=0$. Conversely, an optical signal having a wavelength giving $\alpha(\lambda)>0$ provides signal power and optical SNR both larger than the optical signal having the wavelength giving $\alpha(\lambda)=0$. As a result, the deviation in signal power and the deviation in optical SNR occur between channels. Suppression of such signal power deviation and optical SNR deviation is achieved by gain equalization.

It is now assumed that an optical filter (gain equalizer; GEQ) is inserted in the subsection 30 (#k) to gain equalize the signal power. To equalize the signal power deviation, the wavelength dependence of loss of the optical filter and the wavelength dependence of gain of the n optical amplifiers 32 are canceled each other. Further, it is assumed that the optical fiber in the subsection 30 (#k) in which the optical filter is inserted is shortened by the length corresponding to the average loss of the optical filter. On such an assumption, the loss $\Gamma(\lambda)$ in the subsection 30 (#k) in which the optical filter is inserted is given by the following equation.

$$\Gamma(\lambda)=\Gamma o+\alpha(\lambda)\cdot n \tag{6}$$

where $\Gamma o$ is the average section loss and $\Gamma o$ (dB)=−1·Go (dB).

Figure 12B:
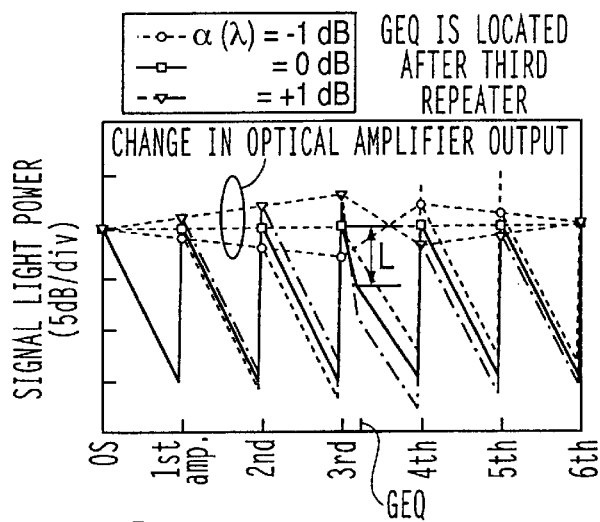

FIG. 12B shows a level diagram in the case that an optical filter is located at a substantially central position in the section 28 (i.e., in the case of k=3 for n=6). In this case, the signal powers in all the channels become equal to each other at the output of the most downstream optical amplifier 32. Furthermore, the average of signal light output powers over the section is constant irrespective of the gain deviation at each wavelength. Therefore, the optical SNR deviation is suppressed to some extent.

Figure 12C:
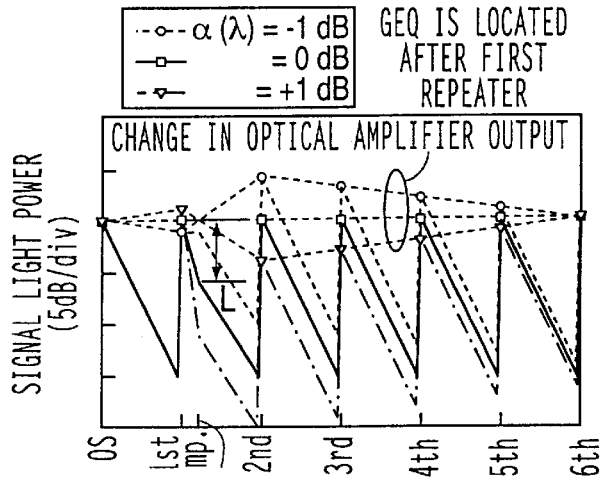

FIG. 12C shows a level diagram in the case that an optical filter is located in the most upstream subsection 30 (#1) (i.e., in the case of k=1 for n=6). As similar to FIG. 12B, the signal power deviation is suppressed at the output of the most downstream optical amplifier 32. However, in the case of FIG. 12C, the average of signal light output powers over the section varies with the gain deviation at each wavelength. Therefore, the optical SNR deviation becomes larger than that in the case of FIG. 12B.

Accordingly, in the case that the insertion position of the equalizer is set at a substantially central position in the section 28, the optical SNR deviation can be minimized. Further, this position setting of the equalizer has another advantage such that the interchannel deviation in output power of the optical amplifier 32 in each subsection can be minimized.

In the above description, the optical filter is designed so that the signal light powers become equal, and the insertion position of the equalizer is decided so that the optical SNR deviation is minimized. Conversely, in the following description, the optical filter is located in a certain subsection, and the wavelength dependence of loss of the optical filter is decided so that the optical SNRs become equal (i.e., according to the present invention). In the case of changing the wavelength dependence of loss of the optical filter from the condition of Eq. (6), so as to suppress the optical SNR deviation, the loss $\Gamma(\lambda)$ in the subsection in which the optical filter is inserted is given by the following equation.

$$\Gamma(\lambda)=\Gamma o+\alpha(\lambda)\cdot n\cdot r(\lambda) \tag{7}$$

where $r(\lambda)$ is the coefficient representing a loss difference between the optical filter for equalizing signal powers and the optical filter for equalizing optical SNRs. The value of $r(\lambda)$ when equalizing signal powers is 1.

If the optical SNR deviation remaining after equalizing signal powers is large, the value of $r(\lambda)$ must be largely shifted from 1 when equalizing optical SNRs. This means increasing the signal power deviation after equalizing optical SNRs. Accordingly, "an equalizer insertion spacing such that $r(\lambda)$ is not shifted from 1 when equalizing optical SNRs" means "an equalizer insertion section such that the signal power deviation is minimized when equalizing optical SNRs", which is equal to "an equalizer insertion section such that the optical SNR deviation is minimized when equalizing signal powers". From the above consideration, the insertion position of the optical filter achieving minimizing of the signal power deviation when equalizing optical SNRs is a substantially central position in the section 28.

By setting the insertion position of the first optical filter 36 in each section 28 as shown in FIG. 6, the signal power deviation in the second optical filter 38 is minimized, thereby allowing a small value of the loss of the second optical filter 38. For such a reason, the additional section 46 excluding the second optical filter 38 can be provided as described with reference to FIG. 9.

Although the input signal powers to each section 28 in the system shown in FIG. 5 are equal and no signal power deviation is present, there is a case that the operation of the optical amplifiers 32 included in each section 28 changes according to the optical spectrum outside of a signal light band.

For example, two different input light spectra as shown in FIGS. 13A and 13B are now assumed. In each spectrum, the signal powers are equal and no signal power deviation is present. However, the spectrum shown in FIG. 13A has no noise light, whereas the spectrum shown in FIG. 13B includes a large noise light spectrum outside of a signal light band. The gain deviation and population inversion parameter of an optical amplifier vary according to an input light spectrum in spite of the fact that all the signal powers are equal. Accordingly, such a difference in spectrum invites a circumference such that the operation of the optical amplifiers 32 in each section 28 changes. This problem can be eliminated by a configuration that each second optical filter 38 includes means for cutting off noise light in a band except a signal light band. This configuration will now be described more specifically.

Figure 14:
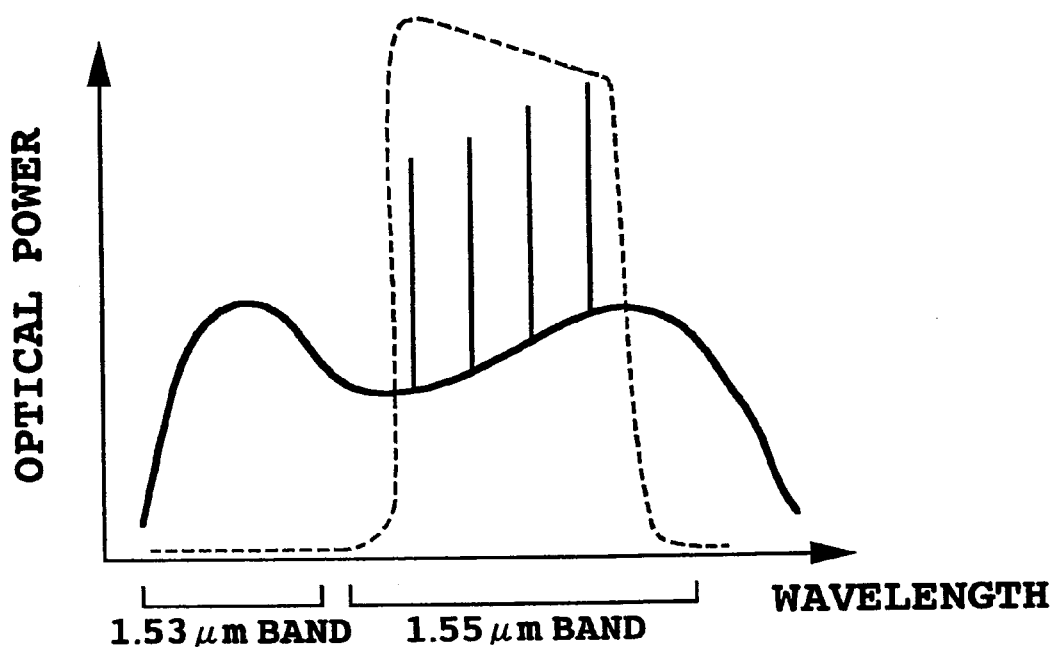
FIG. 14 is an example of the optical spectrum in the case of using an EDFA (erbium doped fiber amplifier).

In the case of using an EDFA as each optical amplifier, the band of signal light is generally set to a 1.55 μm band (1.54 to 1.58 μm), as shown in FIG. 14. In the case of cascading a plurality of EDFAs, a peak of ASE causing a change in operational condition of each section 28 is observed in a 1.53 μm band (1.52 to 1.54 μm) of the optical spectrum. Further, in the example of FIG. 14, positive gain tilt is produced in the signal light band. Accordingly, the characteristics of the second optical filter 38 are set so that it cancels the positive gain tilt as shown by a broken line in FIG. 14 to suppress the signal power deviation. Further, the second optical filter 38 further has such characteristics that it cuts off noise light in a band except the signal light band, especially ASE in the 1.53 μm band. Accordingly, the operation in each section 28 can be made uniform to thereby facilitate designing and construction of the system.

As described above, according to the present invention, it is possible to provide a method for optical amplification and a system for carrying out the method which includes gain equalization on both the deviation in signal power and the deviation in optical SNR (signal-to-noise ratio).

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A method comprising:
   (a) amplifying signal light to obtain amplified signal light;
   (b) gain equalizing said amplified signal light so that a deviation in signal-to-noise ratio of said amplified signal light with respect to wavelength is reduced to obtain first equalized signal light;
   (c) amplifying said first equalized signal light to obtain amplified equalized signal light; and
   (d) gain equalizing said amplified equalized signal light so that a deviation in signal power of said amplified equalized signal light with respect to wavelength is reduced to obtain second equalized signal light.

2. A method according to claim 1, wherein:
said signal light is wavelength division multiplexed (WDM) signal light including a plurality of channels of optical carriers having different wavelengths; and
each of said deviations is an interchannel deviation of said WDM signal light.

3. A system comprising:
a plurality of optical amplifiers cascaded for amplifying signal light;
a first optical filter provided between any two adjacent ones of said plurality of optical amplifiers for gain equalizing said signal light so that a deviation in signal-to-noise ratio of said signal light with respect to wavelength is reduced; and
a second optical filter provided downstream of said plurality of optical amplifiers for gain equalizing said signal light so that a deviation in signal power of said signal light with respect to wavelength is reduced.

4. A system according to claim 3, wherein:
said signal light is wavelength division multiplexed (WDM) signal light including a plurality of channels of optical carriers having different wavelengths; and
each of said deviations is an interchannel deviation of said WDM signal light.

5. A system according to claim 3, wherein said first optical filter is provided at a position dividing said plurality of optical amplifiers into two substantially equal groups.

6. A system according to claim 3, wherein said second optical filter includes means for cutting off noise light in a band except a band of said signal light.

7. A system according to claim 3, wherein:
said signal light has a wavelength included in a 1.55 μm band;
each of said optical amplifiers is an erbium doped fiber amplifier; and
said second optical filter includes means for cutting off noise light in a 1.53 μm band.

8. A system comprising:
an optical fiber span comprising a plurality of sections;
a first terminal station connected to one end of said optical fiber span for supplying signal light to said optical fiber span; and
a second terminal station connected to the other end of said optical fiber span for receiving said signal light from said optical fiber span, wherein each of said plurality of sections comprises
a plurality of optical amplifiers for amplifying said signal light,
a first optical filter provided between any two adjacent ones of said plurality of optical amplifiers for gain equalizing said signal light so that a deviation in signal-to-noise ratio of said signal light with respect to wavelength is reduced, and
a second optical filter provided downstream of said plurality of optical amplifiers for gain equalizing said signal light so that a deviation in signal power of said signal light with respect to wavelength is reduced.

9. A system according to claim 8, wherein:
said signal light is wavelength division multiplexed (WDM) signal light including a plurality of channels of optical carriers having different wavelengths; and
each of said deviations is an interchannel deviation of said WDM signal light.

10. A system according to claim 9, wherein:

said first terminal station comprises a plurality of optical senders for respectively outputting a plurality of optical signals having different wavelengths, and an optical multiplexer for wavelength division multiplexing said plurality of optical signals to output said WDM signal light; and said second terminal station comprises an optical demultiplexer for separating said WDM signal light into a plurality of optical signals, and a plurality of optical receivers for respectively receiving said plurality of optical signals.

11. A system according to claim 8, further comprising:

an optical branching device provided between any two adjacent ones of said plurality of sections for obtaining branch signal light from said signal light;

at least one branch section connected at its one end to said optical branching device; and a third terminal station connected to the other end of said branch section for receiving said branch signal light.

12. A system according to claim 11, wherein said branch section comprises elements respectively corresponding to said optical amplifiers and said first and second optical filters in each of said plurality of sections.

13. A system according to claim 8, further comprising:

an additional section provided between said plurality of sections and said second terminal station, said additional section comprising elements respectively corresponding to said optical amplifiers and said first optical filter in each of said plurality of sections.

14. A system according to claim 13, wherein said second terminal station includes an element corresponding to said second optical filter.

15. A system according to claim 8, further comprising first and second optical attenuators respectively provided downstream of said first and second optical filters for giving attenuation to said signal light, whereby input levels of said plurality of optical amplifiers become substantially equal.

16. A system according to claim 15, wherein each of said first and second optical attenuators comprises an optical fiber, and said attenuation is adjusted according to the length of said optical fiber.

17. A system according to claim 8, wherein said first optical filter is provided at a position dividing said plurality of optical amplifiers in the corresponding section into two substantially equal groups.

18. A system according to claim 8, wherein said second optical filter includes means for cutting off noise light in a band except a band of said signal light.

19. A system according to claim 8, wherein:

said signal light has a wavelength included in a 1.55 μm band;

each of said optical amplifiers is an erbium doped fiber amplifier; and said second optical filter includes means for cutting off noise light in a 1.53 μm band.

20. A system comprising a plurality of optical fiber spans connected by an optical add-drop multiplexer;

each of said optical fiber spans comprising at least one section;

said at least one section comprising:

a plurality of optical amplifiers for amplifying signal light;

a first optical filter provided between any two adjacent ones of said plurality of optical amplifiers for gain equalizing said signal light so that a deviation in signal-to-noise ratio of said signal light with respect to wavelength is reduced; and a second optical filter provided downstream of said plurality of optical amplifiers for gain equalizing said signal light so that a deviation in signal power of said signal light with respect to wavelength is reduced.

21. A method comprising:

gain equalizing an amplified signal light so that a deviation in signal-to-noise ratio of the amplified signal light with respect to wavelength is reduced, to thereby obtain an equalized signal light;

amplifying the equalized signal light, to thereby obtain an amplified equalized signal light; and gain equalizing the amplified equalized signal light so that a deviation in signal power of the amplified equalized signal light with respect to wavelength is reduced.

22. An apparatus comprising:

means for gain equalizing an amplified signal light so that a deviation in signal-to-noise ratio of the amplified signal light with respect to wavelength is reduced, to thereby obtain an equalized signal light;

an amplifier amplifying the equalized signal light, to thereby obtain an amplified equalized signal light; and means for gain equalizing the amplified equalized signal light so that a deviation in signal power of the amplified equalized signal light with respect to wavelength is reduced.

23. An apparatus comprising:

a first equalizer gain equalizing an amplified signal light so that a deviation in signal-to-noise ratio of the amplified signal light with respect to wavelength is reduced, to thereby obtain an equalized signal light;

an amplifier amplifying the equalized signal light, to thereby obtain an amplified equalized signal light; and a second gain equalizer gain equalizing the amplified equalized signal light so that a deviation in signal power of the amplified equalized signal light with respect to wavelength is reduced.

* * * * *